(12) United States Patent
Bouloy et al.

(10) Patent No.: US 8,550,371 B2
(45) Date of Patent: Oct. 8, 2013

(54) THERMOSTATIC ASSEMBLY FOR FLUID FLOW ADJUSTMENT, AND METHOD MAKING FOR SUCH ASSEMBLY

(75) Inventors: Alain Bernard Armand Bouloy, Etrechy (FR); Thierry Maraux, Les Clays Sous Bois (FR)

(73) Assignee: Vernet, Ollainville (FR)

( * ) Notice: Subject to any disclaimer, the term of this patent is extended or adjusted under 35 U.S.C. 154(b) by 1033 days.

(21) Appl. No.: 12/450,664

(22) PCT Filed: Apr. 9, 2008

(86) PCT No.: PCT/FR2008/000492
§ 371 (c)(1),
(2), (4) Date: Oct. 5, 2009

(87) PCT Pub. No.: WO2008/139066
PCT Pub. Date: Nov. 20, 2008

(65) Prior Publication Data
US 2010/0089467 A1    Apr. 15, 2010

(30) Foreign Application Priority Data

Apr. 10, 2007 (FR) ...................................... 07 02595

(51) Int. Cl.
*G05D 23/12* (2006.01)

(52) U.S. Cl.
USPC ...... 236/100; 236/93 A; 236/93 R; 236/99 R; 236/99 K; 236/99 J; 251/362

(58) Field of Classification Search
USPC ....... 236/12.11, 93 R, 93 A, 99 R, 100, 99 K, 236/99 J; 251/333, 334, 357, 362
See application file for complete search history.

(56) References Cited

U.S. PATENT DOCUMENTS

| 3,087,676 | A |   | 4/1963 | Neher, Jr. et al. |
|---|---|---|---|---|
| 4,022,377 | A |   | 5/1977 | Wagner et al. |
| 4,763,834 | A | * | 8/1988 | Duprez .................... 267/140.12 |
| 2002/0084598 | A1 | * | 7/2002 | Bouloy et al. ................. 277/637 |

FOREIGN PATENT DOCUMENTS

| FR | 1 232 775 A | 10/1960 |
|---|---|---|
| FR | 2 557 632 A | 7/1985 |
| GB | 947 736 A | 1/1964 |
| WO | WO 03/095879 A | 11/2003 |

\* cited by examiner

*Primary Examiner* — Marc Norman
*Assistant Examiner* — Jonathan Bradford
(74) *Attorney, Agent, or Firm* — Dowell & Dowell, P.C.

(57) ABSTRACT

A thermostat assembly including a flow blocking sleeve and a seat between which is defined a flow passage through which a fluid can flow and wherein the sleeve has an end opposing a bearing surface of the seat which extends perpendicular to an axis of the sleeve, and wherein the sleeve and the seat are movable relative to one another by movement of a piston of a thermostatic member to thereby control flow through the flow passage which is radial to the axis and wherein a gasket is crimped within a housing formed between a lateral wall adjacent the end of the sleeve and a ring so as to be secured to be normally engaged with the bearing surface to prevent flow through the flow passage unless the passage is opened by separation of the gasket from the bearing surface by movement of the piston in response to the thermostatic member being activated.

10 Claims, 2 Drawing Sheets

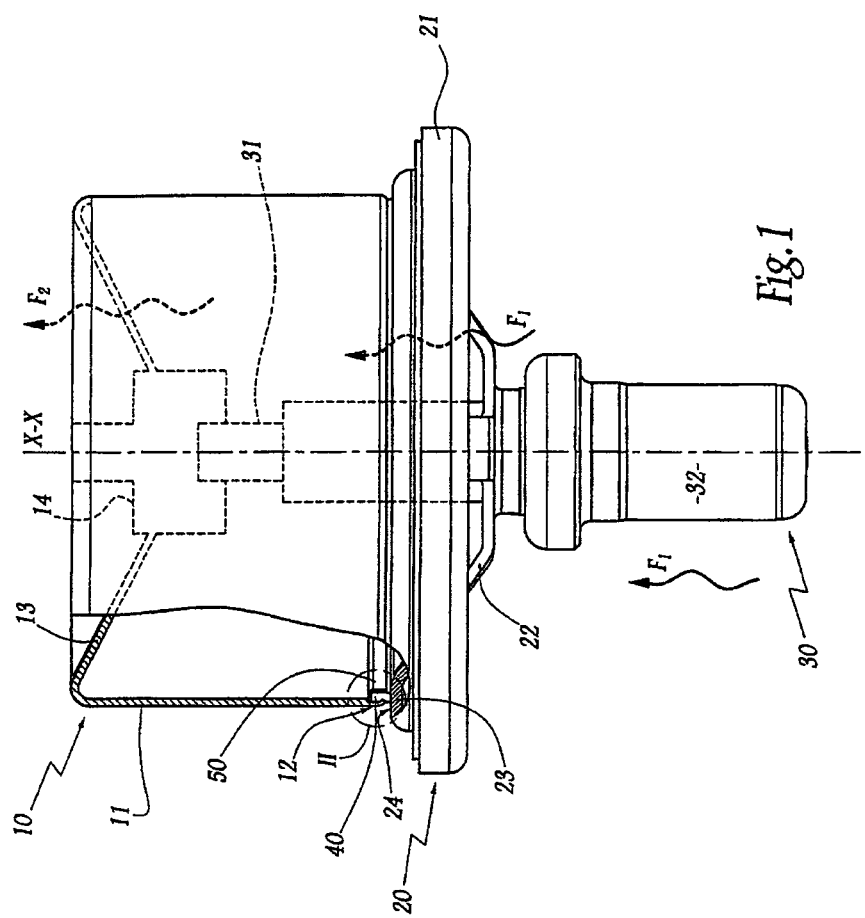

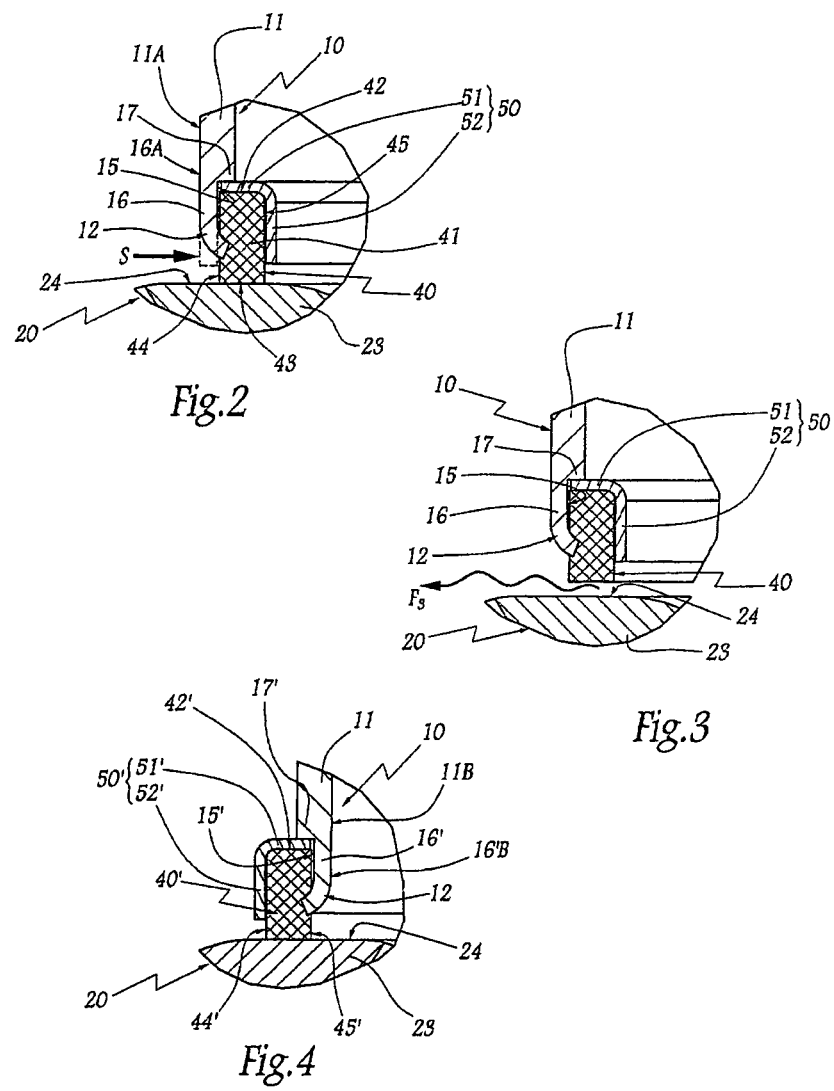

THERMOSTATIC ASSEMBLY FOR FLUID FLOW ADJUSTMENT, AND METHOD MAKING FOR SUCH ASSEMBLY

BACKGROUND OF THE INVENTION

1. Field of the Invention

The present invention relates to a thermostatic fluid flow regulating assembly comprising, by way of the flow-obstructing part, a sleeve whose movements are controlled by a thermostatic element influenced by the temperature of the moving fluid.

2. Brief Description of the Related Art

This kind of thermostatic assembly is used in valves generally employed in cooling circuits used in heat engines of large cylinder capacity, such as those used in lorries and certain motor vehicles, where the fluid flow rates necessary for their operation are higher than those found in heat engines of smaller cylindrical capacity, in which the thermostatic valves are of the shutter type.

The reason for the use of a sleeve is that it generally enables the use of a so-called balanced flow obstructor, that is to say an obstructor where the pressure differential between the two sides of the walls of the sleeve is approximately zero in the direction in which the obstructor is moved by the thermostatic element. This direction corresponds in practice to the axial direction of the sleeve. In contrast to this, in a shutter-type thermostatic valve, the shutter is in a plane perpendicular to the direction in which the shutter is moved by the thermostatic element, which means that the pressure differential between the two sides of the shutter in this direction reaches high values, especially when the fluid flow is interrupted by the shutter. The energy required to lift the shutter off its seat in this condition is often very great, and is greater the higher the flow rate of the fluid to be regulated.

The invention is concerned more particularly with thermostatically controlled sleeves used in combination with a flat bearing seat on an axial end of the sleeve, which is generally in the shape of a flat annular edge. An example of this kind of sleeve is given in EP-A-1 486 843. A fluid flowing radially with respect to the axis of the sleeve can then be regulated by the relative gap between the end of the sleeve and the seat. In particular, when the end of the sleeve is pressed against the seat, this fluid flow is theoretically zero. In practice, however, the sleeve/seat contact allows a certain amount of radial leakage due to the metal/metal nature of this contact. To limit these leaks, it is known practice to overmould the flat seat with rubber. This improves the leaktightness of the contact between the sleeve and the seat. This solution is technically reliable because it is based on technical teaching relating to the overmoulding of the shutters referred to earlier. However, this overmoulding is expensive and often difficult to make compatible, from the technical point of view, with the seat environment, depending in particular on the integration of the thermostatic regulation assembly into a valve housing of a specific geometry. As a result, leaks through the contact between the sleeve and the seat have hitherto very often been tolerated.

U.S. Pat. No. 4,022,377 discloses another example of a thermostatically controlled obstructing sleeve. To improve the regulation of the flow of a fluid between the end of the sleeve and a flat metal seat, a metal insert whose outer face is generally a frustum of a cone is attached to the end of the sleeve and bears against and moves progressively away from the seat, depending on the movements of the sleeve. In this way, fluid admitted between the frustoconical face of the insert and the seat increases in a progressive and controlled manner as the sleeve lifts off the seat. However, because of the rigidity of this insert, which is typically hardened steel, the insert/seat contact when the sleeve is supposed to close the seat leaks in the same way as described above. In the long term, these leaks also tend to increase during burring and/or indentation of the seat by the action of the insert, unless this seat is made of harder, tougher metal, but this increases the cost and does no more than stabilize leakage at a non-zero level.

SUMMARY OF THE INVENTION

The object of the present invention is to provide a thermostatic sleeve assembly that has a better seal between the end of the sleeve and its bearing seat and yet is easier to manufacture and install in a large number of valve housings, especially pre-existing valve housings.

To this end, the subject of the invention is a thermostatic fluid flow regulating assembly as defined herein and as shown in the drawings.

The idea on which the invention is based is to attach a gasket, such as a cut gasket or a moulded gasket, to the end of the sleeve, essentially in the axis of this sleeve, so that the gasket forms a flat leaktight contact with the seat when it is desired to interrupt the flow of fluid. The advantage of this is that, owing to the structure of the thermostatic assembly according to the invention, the movements of the sleeve, controlled by the thermostatic element, are perpendicular to the bearing surface defined by the seat. Consequently, by making the separate gasket at least partially axially continuous with the body of the sleeve, this gasket is efficiently compressed in the axial direction of the sleeve between the latter and the seat when in the fluid flow obstructing position. A highly leaktight peripheral line is thus obtained.

The gasket is by nature, of course, a flexible gasket, that is a gasket which deforms elastically when compressed or crushed. This gasket thus efficiently fills the positioning gap between the end of the sleeve and the seat and creates a complete seal all the way around its line of contact, pressing onto the seat when the sleeve is sufficiently close to the seat. In practice, the gasket is advantageously a rubber gasket, in elastomer, for example.

The use of a separate gasket is economical because the gasket used is readily commercially available. Moreover, since this gasket is attached to the end of the sleeve, the bearing seat for this end requires no modification, and thus causes no corresponding stress on the valve housing in which the thermostatic assembly according to the invention is fitted. Also, since the separate gasket is located in the axis of the sleeve, its presence can be designed, according to the invention, to minimize the disturbance to the flow of a fluid passing axially through the sleeve. In other words, with the invention, the gasket can be attached in such a way as to reduce to a minimum the head losses associated with the presence of the sleeve.

An embodiment which is practical to produce is specified in the following description of the invention.

Also, forms of the invention which are both technically and economically satisfactory are described in the following description of the invention.

One simple and effective embodiment of the invention is specified in the following description of the invention.

Other advantageous features of the assembly according to the invention, taken in isolation or in any technically possible combination, are set out in the following description of the invention.

The invention also relates to a method for manufacturing a thermostatic fluid flow regulating assembly as defined herein.

The method according to the invention can be used in particular to manufacture a thermostatic assembly as defined above.

One advantageous implementation of this method is specified herein.

BRIEF DESCRIPTION OF THE DRAWINGS

The invention will be understood more clearly on reading the following description, which is given purely by way of example with reference to the drawings, in which:

FIG. 1 is a diagrammatic side view, with partial cutaway, of a thermostatic assembly in accordance with the invention;

FIG. 2 is an enlarged view of detail II circled in FIG. 1;

FIG. 3 is a view similar to FIG. 2, illustrating the thermostatic assembly of FIGS. 1 and 2 in a different state of operation from that illustrated in those two figures; and FIG. 4 is a view similar to FIG. 2, illustrating a variant of the invention.

DESCRIPTION OF THE PREFERRED EMBODIMENTS

FIGS. 1 to 3 show a thermostatic assembly comprising a sleeve 10, a seat 20 and a thermostatic element 30. This thermostatic assembly is suitable for regulating a flow of fluid through this assembly, with an incoming fluid supply $F_1$ and two outgoing fluid discharges $F_2$ and $F_3$, as explained in detail below.

The sleeve 10 comprises an uninterrupted tubular main body 11 with a circular base and its centre on a longitudinal axis X-X. At one of its axial ends, marked 12, corresponding to its bottom end in the figures, the body 11 is freely open, while at its other end the body 11 is occupied by an end wall 13 across the axis X-X. This end wall 13 is interrupted so that the incoming fluid $F_1$ admitted into the body 11 through its end 12 is discharged through its end wall 13 to form the outgoing fluid $F_2$. In practice, the end wall 13 may for example consist of metal spokes extending within the sleeve at an angle to the X-X axis from the top end of the body 11 and formed integrally with this body.

The end wall 13 is connected in its centre, through which the X-X axis passes, to a block 14, to which the inner ends of the spokes forming the end wall 13 are fixed, in particular. The block 14 forms an axial stop for a piston 31 which belongs to the thermostatic element 30 and whose centre is on the X-X axis. The piston 31 is able to move relative to a cup 32 belonging to the element 30, which contains a thermodilatable material, such as a wax, the change in volume of which causes the piston to move translationally along the X-X axis. The cup 32 is heat-sensitive, in the sense that, as the temperature of the incoming fluid $F_1$ in which this cup is immersed rises, the wax inside it expands and causes a translational movement of the piston 31 which in turn moves the sleeve 10 with a corresponding translational movement. A spring (not shown) inserted appropriately between on the one hand the sleeve 10, or a part fixed to this sleeve, and on the other hand the cup 32, or a part fixed to this cup, moves the sleeve back translationally as the temperature of the incoming fluid $F_1$ falls, thus allowing the piston 31 to retract inside the cup.

The movements of the sleeve 10 thus controlled by the thermostatic element 30 regulate the passage of the incoming fluid $F_1$ between the bottom end 12 of the sleeve and the seat 20, to form the outgoing fluid $F_3$ (FIG. 3). For this purpose, the seat 20 comprises a main annular body 21 whose centre is on the X-X axis and which is fixed to the cup 32 by, for example, a rigid stirrup 22. This stirrup is perforated, in the appropriate direction for the incoming fluid $F_1$ to be able to flow through the stirrup, in the direction of the X-X axis, and thus enter the body 11 of the sleeve 10, after passing axially through the body 21.

The body 21 forms a peripheral edge 23 situated axially in front of the end 12 of the sleeve 10. As FIGS. 2 and 3 clearly show, this edge 23 defines, on its sleeve 10-facing side, a planar surface 24 extending in a plane perpendicular to the X-X axis. This surface 24 thus forms a bearing surface for the end 12 of the sleeve 10, so that, depending on the axial gap between this surface and that end, the sleeve closes to a greater or lesser extent the radial passage for the fluid $F_1$ to flow out and form the fluid $F_3$.

A gasket 40 is attached to the end 12 of the sleeve 10. In the example considered, this gasket 40 is an annular body 41 made of rubber, whose centre is on the X-X axis and which has an essentially rectangular cross section. The body 41 thus has, on the one hand, a top face 42 and bottom face 43 opposite each other, the former turned towards the sleeve 10 and the latter towards the seat 20, and on the other end an outer face 44 and inner face 45, also opposite each other, the former turned away from and the latter towards the X-X axis.

The gasket 40 is partially housed in a peripheral housing 15 defined by the end 12 of the sleeve 10. This housing forms a sort of shoulder on the inside of the body 11 of the sleeve. Thus, in a radial direction relative to the X-X axis, the housing 15 is open to the inside of the body 11 and closed to the outside by a peripheral outer wall 16 that is part of the same material as the body 11, thus forming an integral part of the end 12. Advantageously, the outer face 16A of the wall 16 is, at least in its upper part connected to the body 11, cylindrical and of axis X-X and has the same diameter as the outer face 11A of the body 11, so that these faces 16A and 11A are cylindrically continuous with each other. In this way the presence of the housing 15 and of the gasket 40 housed in this housing do not create any outward projections at the end 12 of the sleeve 10. In other words, the dimensions of this end 12, on its outward side, are not modified by the presence of the housing 15 and gasket 40. The sleeve 10 can therefore be fitted in place of a pre-existing sleeve that does not have the gasket 40.

In the direction of the X-X axis, the housing 15 is open in the downward direction and closed at the top by an end wall 17 that is part of the same material as the body 11 of the sleeve. This wall 17 thus forms an integral part of the end 12 of the body 11.

The gasket 40 is fixed in the housing 15 partly by the wall 16, which, particularly at its bottom end, is bent in, that is it is inclined so as to converge downwards in the direction of the X-X axis. The bent part of the wall 16 therefore squeezes the outer face 44 of the gasket 40, penetrating into this face by flexible deformation of the gasket. To absorb the deformation stresses on the body 41 and thus grip the gasket 40 securely in the housing 15, the top face 42 and inner face 45 of the gasket are covered by a separate ring 50. This ring is made of a mechanically strong material to withstand the holding forces on the gasket 40, besides the deformations due to the high temperatures of the regulated fluid.

For this purpose, the ring 50 has a cross section in the shape of an inverted L. The ring 50 thus has a planar top wall 51 extending in a plane perpendicular to the X-X axis when the ring is fitted to the sleeve. At the inward edge of the wall 51, an annular lateral wall 52 extends downwards in a direction parallel to the X-X axis. When the ring 50 is assembled to the housing 15, the wall 51 is axially interposed between the top face 42 of the gasket 40 and the end wall 17 of the housing 15, while the outer wall 16 and the wall 52 grip the gasket radially between themselves, covering the outer face 44 and inner face 45, respectively, of the gasket. The bottom face 43 of the gasket remains exposed, extending down beyond the axial level of the bottom edges of the walls 16 and 52.

To assemble the gasket 40 to the end 12 of the sleeve 10, this end is first shaped to define the housing 15 in it, typically by machining or stamping the lower end of the body 11. At the end of this shaping step, the wall 16 is as shown in broken lines in FIG. 2, that is to say it is cylindrical.

The ring 50 is then fitted to this end 12 by inserting it from the bottom into and coaxially with this sleeve, until the outer edge of the wall 51 meets the end wall 17 axially. Simultaneously with the ring 50, or after the latter is fitted, the gasket 40 is fitted to the end 12, with its top face 42 covered by the wall 51, while its outer 44 and inner 45 faces are covered by the walls 16 and 52, respectively. The wall 16, chiefly its lower end, is then crimped to grip the gasket, that is to say the wall 16 is bent towards the X-X axis, preferably all the way around its periphery, until it is as shown in solid lines in the figures. In practice, the wall 16 is crimped using a rolling or punching type tool which, as indicated by the arrow S in FIG. 2, applies a radial force directed towards the X-X axis, relative positioning and movements of this tool and sleeve 10 being selected as appropriate.

Crimping the wall 16 deforms the material of the body 41 of the gasket 40 so that the latter is trapped, with its faces 42 and 44 pressed against the walls 51 and 52 of the ring 50.

Once the gasket 40 is thus secured and immobilized on the end 12 of the sleeve 10, the sleeve 10, the seat 20 and the thermostatic element 30 are assembled together.

In operation, when the thermostatic element 30 and its associated return spring move the sleeve 10 translationally towards the seat 20, in other words when the end 12 moves from the position shown in FIG. 3 to that shown in FIG. 2, the gasket 40 is moved with it along a straight translational movement parallel to the X-X axis, in such a way that its bottom face 43 is pressed against the surface 24 of the edge 23. The contact between the face 43 and the surface 24 is thus a plane/plane contact, which is a highly efficient way of creating a seal. Also, this contact is firm, in the sense that the force which moves and compresses the gasket 40 against the edge 23 is transmitted parallel to the X-X axis to every point on the outer part of the gasket 40, that is the peripheral part of this gasket extending axially beneath the end wall 17, through the outer part of the wall 51. In other words, a substantial part of the gasket 40 is axially in line with the inner peripheral part of the body 11 of the sleeve 10 and is thus firmly pushed down at right angles to the surface 24. The rest of the gasket, i.e. its inner peripheral part, is also pressed firmly against the surface 24 by the ring 50, primarily the inner part of its wall 51, through which the forces of movement and compression against the edge 23 are efficiently transmitted.

The quality of the seal created by the plane/plane contact between the gasket 40 and the surface 24 is such that the thermostatic assembly incorporating the sleeve 10 can be used to regulate a fluid flow in the opposite direction to that considered in FIG. 1. On this point, it will be observed that the directions of flow of the fluids indicated thus far are illustrative only, and the thermostatic assembly can be fitted equally well to a valve with one inlet and two outlets, or to a valve with two inlets and one outlet, or even to other valves in which a fluid flow radial to the X-X axis is to be regulated by the interaction between the end 12 of the sleeve and the seat 20. Similarly, the kinematic relations between the thermostatic element 30 and the sleeve 10/seat 30 pair can be reversed, thus connecting the sleeve to the cup 32, and the seat to the piston 31.

Various arrangements and variants of the thermostatic assembly and its method of manufacture described above may also be envisaged. As an example, FIG. 4 shows a "symmetrical" variant of the embodiment shown in FIGS. 1 to 3, in the sense that the gasket 40' of this variant is fitted not to the inside but to the outside of the end 12 of the sleeve 10. For this purpose this end 12 defines a housing 15' which is open both outwards and downwards, but closed towards the inside by an inner wall 16', and upwards by an end wall 17', these walls 16' and 17' forming integral parts of the end 12 of the body 11 of the sleeve, having been produced by appropriate shaping of the end 12. A ring 50' "symmetrical" to the ring 50 is fitted to assemble the gasket 40' to the housing 15': the gasket 40' is jammed or trapped by crimping, by bending the wall 16' outwards so that it penetrates into the inner face 45' of the gasket and thus deforms the latter until the top face 42' and outer face 44' are pressed against the top wall 51' and side wall 52', respectively, of the ring 50'.

The variant shown, in FIG. 4 has the advantage over the embodiment shown in FIGS. 1 to 3 of not having any part that projects inwards at the end 12 of the sleeve 10. The inner face 16'B of the wall 16' is cylindrically continuous with the inner wall 11B of the body 11 of the sleeve. Consequently the decision as to which of the two embodiments illustrated should be chosen is connected to the question of the inward or outward space requirement at the end 12 of the sleeve 10.

In practice, the wall 16 is easier to crimp than the wall 16', as the tooling required to bend this wall 16 is easier to control from the outside of the sleeve 10.

Another variant which is not shown is to trap the gasket 40 or 40' by bending the side wall 52 or 52' of the ring 50 or 50' towards the wall 16 or 16', either instead of in addition to the bending of the wall 16 or 16'.

The invention claimed is:

1. A thermostatic fluid flow regulating assembly, comprising:
   a flow obstructing sleeve having a center on a longitudinal axis and first and second ends,
   a seat, across which a fluid flow passes and which defines a bearing surface for the first end of the sleeve, the bearing surface extending in a plane approximately perpendicular to the longitudinal axis, and the first end of the sleeve defining a housing which is, in a radial direction relative to the longitudinal axis, both closed by a lateral wall that is integral with a tubular body of the sleeve and open opposite the lateral wall, and which is, in a direction parallel to the longitudinal axis, both open towards the bearing surface and closed opposite the bearing surface by an end wall that is integral with the tubular body of the sleeve,
   a thermostatic element which includes a heat-sensitive part which is across the fluid flow and which contains a thermally expansive material and a movable part which moves in translation relative to the heat-sensitive part in a direction parallel to the longitudinal axis in response to a variation in a volume of the thermally expansive material, the sleeve being connected to one of the heat-sensitive part and the movable part of the thermostatic element and the seat being connected to the other of the heat-sensitive part and the movable part of the thermostatic element, in such a way that the relative movements of the heat-sensitive part and the movable part along the longitudinal axis control the flow of fluid radially to the longitudinal axis through a passage formed axially between the first end of the sleeve and the bearing surface, and a flexibly deformable gasket which is secured within the housing by a ring having both a first wall interposed axially between the end wall and the gasket and a second wall, the gasket being radially interposed between the second wall of the ring and the lateral wall of the sleeve such that a portion of the gasket extends outwardly of the housing toward the bearing surface, at least one of the lateral wall of the sleeve and the second wall of the ring being bent toward the other of the lateral wall and the second wall to crush the gasket.

2. The assembly as claimed in claim 1, wherein the at least one of the lateral wall of the sleeve and the second wall of the ring which is bent is the one which is the furthest from the longitudinal axis of the sleeve.

3. The assembly as claimed in claim 1, wherein an outer surface of the body of the sleeve and an outer surface of the lateral wall portion of the sleeve are cylindrically continuous with each other.

4. The assembly as claimed in claim 1, wherein the gasket is made of rubber.

5. A method for manufacturing a thermostatic fluid flow regulating assembly, wherein the assembly includes:

a flow obstructing sleeve having a center on a longitudinal axis and first and second ends, a seat across which a fluid flow passes and which defines a bearing surface for the first end of the sleeve, the bearing surface extending in a plane approximately perpendicular to the longitudinal axis, and the first end of the sleeve defining a housing which is, in a radial direction relative to the longitudinal axis, both closed by a lateral wall that is integral with a tubular body of the sleeve and open opposite the lateral wall, and which is, in a direction parallel to the longitudinal axis, both open towards the bearing surface and closed opposite the bearing surface by an end wall that is integral with the tubular body of the sleeve, a thermostatic element which includes a heat-sensitive part which is across the fluid flow and which contains a thermally expansive material and a movable part which moves in translation relative to the heat-sensitive part in a direction parallel to the longitudinal axis in response to a variation in a volume of the thermally expansive material, and wherein the method comprises the steps of connecting the sleeve to one of the thermo-sensitive part and movable part of the thermostatic element and connecting the seat to the other of the heat-sensitive part and the movable part of the thermostatic element, in such a way that the relative movements of the heat-sensitive element and the movable part along the longitudinal axis controls the flow of fluid radially to the longitudinal axis, through a passage formed between the first end of the sleeve and the bearing surface, inserting a ring into relationship with the lateral wall of the tubular body of the sleeve wherein the ring has both a first wall interposed axially between the end wall of sleeve and a second wall that extends in space relationship to the lateral wall of the sleeve, inserting a flexible gasket within the housing so as to be radially interposed between the second wall of the ring and the lateral wall of the sleeve in such a way that at least part of the gasket extends outwardly of the housing toward the bearing surface, and securing the gasket within the housing by bending of at least one of the lateral wall of the sleeve or the second wall of the ring toward the other of the lateral wall or the second wall of the ring to crush the gasket within the housing.

6. The method as claimed in claim 5, wherein:

during the step of securing the gasket the at least one of the lateral wall of the sleeve or the second wall of the ring is bent in a transverse direction relative to the longitudinal axis of the sleeve in order to crush the gasket within the housing.

7. The method of claim 6 wherein the at least one of the lateral wall of the sleeve and the second wall of the ring is bent by machining.

8. The method of claim 6 wherein the at least one of the lateral wall of the sleeve and the second wall of the ring is bent by punching.

9. The assembly as claimed in claim 1, wherein the gasket is made of an elastomer.

10. The assembly as claimed in claim 1, wherein an inner surface of the body of the sleeve and an inner surface of the lateral wall portion of the sleeve are cylindrically continuous with each other.

* * * * *